(12) United States Patent
Casadei et al.

(10) Patent No.: US 12,066,038 B2
(45) Date of Patent: Aug. 20, 2024

(54) BALER CONNECTABLE TO A TRACTOR FOR PROVIDING ROUND BALES AND METHOD FOR PRODUCING ROUND BALES

(71) Applicant: KVERNELAND GROUP RAVENNA S.R.L., Russi (IT)

(72) Inventors: Valerio Casadei, Cesena (IT); Cosimo Frascella, Lugo (IT)

(73) Assignee: KVERNELAND GROUP RAVENNA S.RL., Ravenna (IT)

( * ) Notice: Subject to any disclaimer, the term of this patent is extended or adjusted under 35 U.S.C. 154(b) by 0 days.

(21) Appl. No.: 18/200,498

(22) Filed: May 22, 2023

(65) Prior Publication Data

US 2023/0292670 A1    Sep. 21, 2023

Related U.S. Application Data

(63) Continuation of application No. 16/630,961, filed as application No. PCT/IB2018/056006 on Aug. 9, 2018, now Pat. No. 11,696,532.

(30) Foreign Application Priority Data

Aug. 11, 2017  (IT) .................. 102017000093544

(51) Int. Cl.
 *F15B 13/04*   (2006.01)
 *A01F 15/07*   (2006.01)
 (Continued)

(52) U.S. Cl.
 CPC .......... *F15B 13/0401* (2013.01); *A01F 15/07* (2013.01); *A01F 15/0883* (2013.01);
 (Continued)

(58) Field of Classification Search
 CPC .............. F15B 13/0401; F15B 13/0416; F15B 15/14; F15B 21/08; F15B 21/085; F15B 21/087;
 (Continued)

(56) References Cited

U.S. PATENT DOCUMENTS

| | | | |
|---|---|---|---|
| 5,165,332 A * | 11/1992 | Lee | A01F 15/0833 100/88 |
| 6,079,324 A * | 6/2000 | Feraboli | A01F 15/07 100/88 |
| 6,457,295 B1 | 10/2002 | Arnold | |
| 7,331,279 B2 | 2/2008 | Biziorek et al. | |
| 7,472,649 B1 | 1/2009 | Derscheid et al. | |

(Continued)

FOREIGN PATENT DOCUMENTS

| | | | | |
|---|---|---|---|---|
| CN | 109156178 | | 1/2019 | |
| EP | 0264328 A1 * | 4/1988 | ......... A01F 15/0883 |

(Continued)

OTHER PUBLICATIONS

International Search Report dated May 12, 2018 in International Application No. PCT/IB2018/056006.

*Primary Examiner* — Arpad Fabian-Kovacs
(74) *Attorney, Agent, or Firm* — Wentsler LLC (57) ABSTRACT

A baler connectable to a tractor for providing round bales comprises: a frame supported on a wheel axle; a chamber, for receiving crops and for housing a formed bale, the chamber having a fixed, predetermined size; a tailgate connected to the frame and movable between a closed position and an open position; a conveying assembly which has a first portion provided in the frame and a second portion provided in the tailgate; a cylinder-piston actuator, which includes a closing chamber and moves the tailgate from the open position to the closed position; a binder, configured for binding the formed bale with a fastening element; a pressure (Continued)

sensor for detecting a control signal representative of a pressure inside the closing chamber of the cylinder-piston actuator; a control unit, configured to generate an alert signal as a function of the control signal.

17 Claims, 2 Drawing Sheets

(51) Int. Cl.
*A01F 15/08* (2006.01)
*B65B 27/12* (2006.01)
*B65B 13/18* (2006.01)
*B65B 57/00* (2006.01)
*E02F 9/22* (2006.01)
*F15B 15/14* (2006.01)
*F15B 21/08* (2006.01)

(52) U.S. Cl.
CPC ............ *B65B 27/12* (2013.01); *B65B 13/18* (2013.01); *B65B 57/00* (2013.01); *E02F 9/2289* (2013.01); *F15B 2013/0412* (2013.01); *F15B 13/0416* (2013.01); *F15B 15/14* (2013.01); *F15B 21/08* (2013.01); *F15B 21/085* (2013.01); *F15B 21/087* (2013.01); *F15B 2211/27* (2013.01); *F15B 2211/50563* (2013.01); *F15B 2211/632* (2013.01); *F15B 2211/6323* (2013.01); *F15B 2211/6326* (2013.01); *F15B 2211/7053* (2013.01)

(58) Field of Classification Search
CPC .......... F15B 2013/0412; F15B 2211/27; F15B 2211/50563; F15B 2211/632; F15B 2211/6323; F15B 2211/6326; F15B 2211/7053; E02F 9/2289; B65B 13/18; B65B 27/12; B65B 57/00; A01F 15/0883; A01F 15/0833; A01F 15/07
See application file for complete search history.

(56) References Cited

U.S. PATENT DOCUMENTS

| | | | |
|---|---|---|---|
| 9,980,437 B2 * | 5/2018 | Smith | ................. A01F 15/0883 |
| 10,334,787 B2 | 7/2019 | Humbert et al. | |
| 10,537,066 B1 | 1/2020 | Pramod | |
| 10,653,067 B1 | 5/2020 | Jones | |
| 11,160,216 B2 | 11/2021 | Lebeau et al. | |
| 2009/0223196 A1 | 9/2009 | Smith | |
| 2013/0298787 A1 | 11/2013 | Simmons et al. | |
| 2015/0107236 A1 * | 4/2015 | Udagawa | .............. E02F 9/2217 60/430 |
| 2015/0143791 A1 * | 5/2015 | Smith | ................. A01F 15/0883 56/341 |
| 2015/0272007 A1 | 10/2015 | Smith | |
| 2016/0360705 A1 * | 12/2016 | Singh | ..................... F15B 21/08 |
| 2017/0290271 A1 | 10/2017 | Jones et al. | |
| 2020/0205348 A1 | 7/2020 | Sloan et al. | |
| 2021/0088059 A1 | 3/2021 | Brewer | |
| 2021/0329843 A1 * | 10/2021 | Kraus | ................. F15B 11/0406 |

FOREIGN PATENT DOCUMENTS

| | | | | |
|---|---|---|---|---|
| EP | 1444882 | | 8/2004 | |
| EP | 1593299 | | 11/2005 | |
| EP | 2183957 | | 5/2010 | |
| EP | 2875716 | A1 * | 5/2015 | ............. A01F 15/07 |
| EP | 2875717 | | 5/2015 | |
| EP | 3351086 | B1 * | 4/2020 | ............. A01D 90/08 |
| EP | 3900518 | A1 * | 10/2021 | ............. A01F 15/07 |
| KR | 20130091809 | | 8/2013 | |
| KR | 101425869 | | 8/2014 | |
| WO | 2018056805 | | 3/2018 | |
| WO | 2021148841 | | 7/2021 | |

* cited by examiner

BALER CONNECTABLE TO A TRACTOR FOR PROVIDING ROUND BALES AND METHOD FOR PRODUCING ROUND BALES

TECHNICAL FIELD

This invention relates to a baler connectable to a tractor for providing round bales and to a method for producing round bales in a baler connected to a tractor.

Specifically, the invention relates to a baler having a tailgate movable between a closed position, to delimit a chamber for forming the bale, and an open position, for discharging the formed bale. In this type of balers, it is diffused the necessity to control the density of the bale and to open the tailgate when the bale reaches a target density.

BACKGROUND ART

In several known solutions, a cylinder piston actuator is provided in a baler in order to open and close a tail gate of the baler. For example, EP1593299 and EP2183957 disclose solutions including an actuator, connected to the tail gate to provide an opening and/or a closing of said tail gate.

In these solutions, the actuator is driven as a function of sensors responsive to the position of the tailgate or the position (in particular, the orientation) of the cylinder piston actuator. These documents also disclose the possibility of driving the opening of the gate as a function of the size of the bale.

However, in these solutions, the opening of the gate does not depend on a density of the bale. Therefore, the user has a limited control on the whole process.

Disclosure of the Invention

Scope of the present invention is to overcome at least one of the aforementioned drawbacks.

This scope is achieved by the baler the method according to the appended claims.

The baler is connectable to a tractor. The baler is configured for providing round bales.

The baler, in an embodiment, comprises a frame. The baler, in an embodiment, comprises a wheel axle. The wheel axle has a first end and a second end. The baler may comprise a first and a second wheel, pivotally connected to the first and second axle end, respectively. The frame, in an embodiment, is supported on a wheel axle.

The baler, in an embodiment, comprises a chamber. The chamber is configured for receiving crops. In an embodiment, the baler includes a rotary feeder, for feeding crops to the chamber.

The chamber is configured for receiving cops. The chamber is configured for housing the bale during its formation. The chamber is also configured for housing the formed bale (for example, during a step of binding the bale).

The baler comprises a conveying assembly. The conveying assembly delimits a predetermined volume, which defined the chamber. Indeed, this volume, in operation, is initially empty and is increasingly filled with the crops, until the formed bale fills the volume.

In at least an embodiment, said volume is fixed; that is, the volume does not vary its size; that is, the size of the volume (and thus of the chamber) is predetermined and does not vary with the number of crops present in the volume (chamber). Thus, the size of the formed bale is fixed. This type of baler is also denominated "fixed chamber" balers.

The conveying assembly is configured for imparting a rotating movement to the crops inside the chamber. The conveying assembly is connectable to the tractor (through one or more gearboxes) to receive mechanical transmission.

The conveying assembly may be implemented according to various technical solutions; accordingly, the following disclosure of specific embodiments for the conveying assembly is not meant to be limitative. In an embodiment, the conveying assembly includes a plurality of rollers. The plurality of rollers delimits the chamber. The plurality of rollers, in an embodiment, includes a first group of rollers, provided in the frame, and a second group of rollers, provided in the tailgate. The rollers are configured to rotate the crop inside the chamber. In this embodiment, the size of the bale is fixed, depending on the rollers layout.

In another embodiment, the conveying assembly may include a belt, or a plurality of belts, or a chain, or a plurality of chains.

The baler, in a possible embodiment, includes a plurality of belts. The belts of said plurality, in this possible embodiment, delimit the chamber. In an embodiment, each of the belts is mounted on a shaft. The shaft is provided with a pair of sprockets at its ends. The pair of sprockets are connectable to the tractor (through one or more gearboxes) to receive mechanical transmission. The pair of sprockets is configured to move the shaft and, therefore, the belts. The movement of the belts provides a forming of the bale. In this possible embodiment, the formed bale has a variable size, depending on the arrangement of the belts.

In an embodiment, the baler comprises an actuator. The actuator is connected to the frame. The actuator is connected to the tailgate. The actuator is configured to move the tailgate from the open position to the closed position.

The actuator, in an embodiment, is a cylinder-piston actuator.

The cylinder piston actuator, in an embodiment, includes a closing chamber. The cylinder piston actuator, in an embodiment, is connected to the frame. The cylinder piston actuator, in an embodiment, is connected to the tailgate, to move the tailgate from the open position to the closed position. The movement of the tailgate from the open position to the closed position is carried out upon receiving an actuating fluid in the closing chamber.

The baler, in an embodiment, comprises a binder. The baler (in particular, the binder) includes a fastening element (non-limiting examples for the fastening elements are: a wire, a net or twine or film). The binder is configured for binding the formed crop with the fastening element.

The binder, in an embodiment, is configured for guiding the fastening element towards the bale (e.g. through a movable arm which swings from a first position, proximate to a reservoir of fastening element, to a second position, proximate to the bale).

The baler, in an embodiment, comprises a control unit. The control unit is configured to generate an alert signal.

The alert signal is intended to provide the user with information about an operation or status of the baler.

In an embodiment, the alert signal may a warning, for example to warn the user to stop the advancing motion of the tractor; this may be useful (depending on the configuration typology of the baler), in order to stop collecting crops (for example during a binding step).

In another embodiment, the alert signal informs the user that the binding step has started or is to be started in a predetermined amount of time (is substantially imminent).

Generally speaking, the alert signal informs the user that the step of forming the bale is completed or is about to be completed. This means that the binding step is started or will start or is about to start. The alert signal may be provided in a variety of ways. In an embodiment, is an acoustic alarm, or it may be an optical (light) signal, or a combination of the two.

In an embodiment, the control unit is configured to deliver the alert signal to the user in the tractor. The alert signal can be generated in the baler and then delivered to the user in the tractor, or may be generated in the tractor. To deliver the alert signal to the user, a user interface may be employed, or any other means (such as acoustic or optical).

The baler, in an embodiment, comprises a pressure sensor. The pressure sensor is connected to the control unit. The pressure sensor is configured for detecting a control signal. The control signal, in an embodiment, is representative of a pressure inside the closing chamber of the cylinder-piston actuator. The pressure inside the closing chamber is directly related to the force exerted by the cylinder-piston actuator to keep the tailgate closed; therefore, the control signal is directly related to the density of the formed bale, pushing on the tailgate. The pressure sensor is configured for sending the control signal to the control unit. The control unit, in an embodiment, is programmed for generating the alert signal as a function of the control signal.

The cylinder piston actuator, in an embodiment, is a double effect actuator. In this embodiment, the cylinder piston actuator includes, further to the closing chamber, an opening chamber. The closing chamber is configured to be fed with the actuating fluid, for commanding a movement of the tailgate from the closed position to the open position.

The cylinder-piston actuator, in at least another embodiment, is a single-effect actuator. In an embodiment, the cylinder-piston actuator includes the closing chamber and an opening spring. The closing chamber is configured to be fed with the actuating fluid, for commanding a movement of the tailgate from the open position to the closed position. The opening spring is configured to move the tailgate from the closed position to the open position. The opening spring, in an embodiment, stores an elastic force through a compression of the opening spring itself. The opening spring, in an embodiment, stores an elastic force through a traction of the opening spring itself. The opening spring, in an embodiment, is configured to commanding a movement of the tailgate from the closed position to the open position when a pressure force exerted by the actuating fluid inside the closing chamber is lower than the elastic force stored in the opening spring.

In another embodiment, the cylinder-piston actuator is a single-effect actuator. In this embodiment, the cylinder-piston actuator includes an opening chamber and a closing spring. The opening chamber is configured to be fed with the actuating fluid, for commanding a movement of the tailgate from the closed position to the open position. The closing spring is configured to move the tailgate from the open position to the closed position. The closing spring, in an embodiment, stores an elastic force through a compression of the closing spring itself. The closing spring, in an embodiment, stores an elastic force through a traction of the closing spring itself. The closing spring, in an embodiment, is configured to commanding a movement of the tailgate from open the position to the closed position when a pressure force exerted by the actuating fluid inside the opening chamber is lower than the elastic force stored in the closing spring.

In an embodiment, the cylinder-piston actuator is a hydraulic actuator. In an embodiment, the baler comprises a hydraulic circuit. In this embodiment, the actuating fluid is an oil.

In an embodiment, the hydraulic actuator is a single-effect actuator.

In an embodiment, the hydraulic actuator is a double effect-actuator.

In an embodiment, the hydraulic circuit includes a first conduit. In an embodiment, the hydraulic circuit includes a second conduit.

If the hydraulic circuit includes both the first and the second conduit, the hydraulic actuator is a double effect actuator. In this embodiment, the first conduit and the second conduit are selectively connectable to a pressure source. The first conduit and the second conduit, in an embodiment, are connectable to the pressure source through a distributor. The distributor is movable between three positions. A first position, to connect the pressure source to the first conduit. A second position, to connect the pressure source to the second conduit. A third position, to isolate the pressure source from the hydraulic circuit. The pressure source, in an embodiment, is provided inside the tractor. The distributor, in an embodiment, is provided inside the tractor. The pressure source, in an embodiment, is in fluid communication with a fluid tank, provided inside the tractor. The pressure source, in an embodiment, is a hydraulic pump. The first conduit and the second conduit, in an embodiment, are in fluid communication with the closing chamber and with the opening chamber of the cylinder-piston actuator, respectively. In other words, the first conduit, in an embodiment, is in fluid communication with the closing chamber. The second conduit, in an embodiment, is in fluid communication with the opening chamber.

The hydraulic circuit, in at least an embodiment, includes an operating valve. The operating valve, in an embodiment, is inserted in the first conduit. The operating valve, in an embodiment, is operable in an open position, for allowing the actuating fluid to flow from the pressure source to the closing chamber. The operating valve, in an embodiment, is operable in a closed position, for retaining the actuating fluid in the closing chamber. The operating valve, in an embodiment, is double acting valve. The operating valve, in an embodiment, is a non-return valve.

The operating valve, in an embodiment, is a passive valve. In this embodiment, the operating valve includes a spring. The spring is configured for keeping the operating valve in the closed position. The operating valve, in this embodiment, is operable in an open position when a pressure of the actuating fluid in the first conduit wins an elastic force stored in the spring.

In another embodiment, the operating valve is an active valve. In an embodiment, the operating valve is a solenoid valve. In an embodiment, the operating valve is electronically switched from the open position to the closed position (or vice versa).

In an embodiment, the operating valve is connected to the control unit. In this embodiment, the control unit is programmed for commanding an opening of the valve. In this embodiment, the control unit is programmed for commanding a closing of the valve.

In an embodiment, the baler includes a driver. The driver, in an embodiment, is connected to the operating valve.

The driver, in an embodiment, is configured to force the operating valve in an open position, responsive to a pressure in the second conduit. In an embodiment, the driver is a conduit connecting the second conduit with the operating valve. In an embodiment, with the operating valve being a passive valve an including a spring, the driver is configured to make the second conduit in fluid communication with the operating valve, to allow the pressure of the actuating fluid, flowing in the second conduit, win the elastic force of the spring, to open the operating valve.

The driver, in another embodiment, is configured to force the operating valve in the open position, responsive to an electronic signal. In an embodiment, the driver is connected to the control unit. In this embodiment, the control unit is programmed for sending to the driver the electronic signal to force the operating valve in the open position.

In an embodiment, the baler includes a pressure sensor. The pressure sensor, in an embodiment, is a manometer. The pressure sensor, in an embodiment, is in fluid communication with the first conduit, downstream of the operating valve. In other words, the pressure sensor, in an embodiment, is in fluid communication with the first conduit between the operating valve and the closing chamber. The pressure sensor, in an embodiment, is in fluid communication with a first conduit which puts in fluid communication the operating valve and the closing chamber. The pressure sensor, in this embodiment, is configured for detecting the control signal representative of a pressure inside the closing chamber, that is equal to the pressure in the first conduit g valve.

In an embodiment, the hydraulic circuit includes at least a valve connected between the first conduit and the second conduit. Said at least a valve is configured to allow a flow of the actuating fluid from the first conduit to the second conduit, when a first pressure in the first conduit exceeds a second pressure in the second conduit of a predetermined threshold value.

In an embodiment, the hydraulic circuit includes a setting valve. In an embodiment, said at least a valve includes the setting valve. The setting valve, in an embodiment, is connected between the first conduit, upstream the operating valve (in other words, between the pressure source and the operating valve), and the second conduit. The setting valve, in an embodiment, is configured to allow a flow of the actuating fluid from the first conduit to the second conduit, when a first pressure in the first conduit upstream the operating valve exceeds a second pressure in the second conduit of a predetermined first threshold value.

In an embodiment, in which the cylinder-piston actuator is a single effect actuator including an opening spring and a closing chamber, the cylinder-piston actuator can be a hydraulic actuator. In this embodiment, the baler includes a hydraulic circuit including a single closing conduit. The single closing conduit, in this embodiment, is connectable to a pressure source (e.g. a pump). In this embodiment, the hydraulic circuit can include the operating valve, which is inserted in the single closing conduit. In this embodiment, the operating valve is operable in the open position, for allowing the actuating fluid to flow from the pressure source to the closing chamber, and in the closed position, for retaining the actuating fluid in the closing chamber. The operating valve, in this embodiment, could be active (e.g. a solenoid valve) or passive (e.g. a non-return valve). In this embodiment, the hydraulic circuit can include a driver. The driver is connected to the operating valve to force it in the open position, responsive to an electronic signal. The control unit, in this embodiment, is configured for sending the electronic signal to the driver, to open the operating valve. The pressure sensor, in this embodiment, is in fluid communication with the closing conduit, downstream of the operating valve (in other words, between the closing chamber and the operating valve). In this embodiment, the setting valve is connected to the closing conduit, upstream the operating valve (in other words, between the pressure source and the operating valve). The setting valve, in this embodiment, is configured to allow a flow of the actuating fluid from the closing conduit to a recover conduit, when a pressure in the closing conduit upstream the operating valve exceeds a threshold value. In an embodiment, in which the cylinder-piston actuator is a single effect actuator including a closing spring and an opening chamber, the cylinder-piston actuator is a hydraulic actuator. In this embodiment, the baler includes a hydraulic circuit including a single opening conduit. The single opening conduit, in this embodiment, is connectable to a pressure source (e.g. a pump).

In a possible embodiment, the cylinder piston actuator is a pneumatic actuator. In this embodiment, the actuating fluid is gas (e.g. air). In this embodiment, the baler comprises a pneumatic circuit.

In an embodiment, the pneumatic cylinder piston actuator is a double effect actuator. In this embodiment, the pneumatic circuit includes a first conduit and a second conduit. The first conduit and the second conduit, in an embodiment, are selectively connectable to a pressure source. In an embodiment, the pressure source is a compressor. The first conduit, in an embodiment, is in fluid communication with the closing chamber. The second conduit, in an embodiment, is in fluid communication with the opening chamber. In at least an embodiment, the pneumatic circuit includes an operating valve. The operating valve, in an embodiment, is inserted in the first conduit. The operating valve is operable in an open position, for allowing the actuating fluid to flow from the pressure source to the closing chamber, and in a closed position, for retaining the actuating fluid in the closing chamber. The operating valve, in an embodiment, is a passive valve. The operating valve, in an embodiment, is an active valve. In an embodiment, the pneumatic circuit includes a driver. The driver, in an embodiment, is connected to the operating valve to force it in the open position, responsive to a pressure in the second conduit. The driver, in an embodiment, is connected to the operating valve to force it in the open position, responsive to an electronic signal. In an embodiment, the pneumatic circuit includes a setting valve. The setting valve, in an embodiment, is connected between the first conduit, upstream the operating valve (in other words, between the pressure source and the operating valve), and the second conduit. The setting valve, in an embodiment, is configured to allow a flow of the actuating fluid from the first conduit to the second conduit, when a first pressure in the first conduit upstream the operating valve exceeds a second pressure in the second conduit of a predetermined first threshold value.

In at least a possible embodiment, the pneumatic cylinder-piston actuator is a single effect actuator. In an embodiment, the pneumatic cylinder-piston actuator includes a closing chamber and an opening spring. In an embodiment, the pneumatic circuit includes a single closing conduit. The single closing conduit, in this embodiment, is connectable to a pressure source (e.g. a compressor). In this embodiment, the pneumatic circuit can include the operating valve, which is inserted in the single closing conduit. In this embodiment, the operating valve is operable in the open position, for allowing the actuating fluid (gas) to flow from the pressure source to the closing chamber, and in the closed position, for retaining the actuating fluid (gas) in the closing chamber. The operating valve, in this embodiment, could be active (e.g. a solenoid valve) or passive (e.g. a non-return valve). In this embodiment, the pneumatic circuit can include a driver. The driver is connected to the operating valve to force it in the open position, responsive to an electronic signal. The control unit, in this embodiment, is configured for sending the electronic signal to the driver, to open the operating valve. The pressure sensor, in this embodiment, is in fluid communication with the closing conduit, downstream of the operating valve (in other words, between the closing chamber and the operating valve). The setting valve, in this embodiment, is connected between the closing conduit, upstream the operating valve (in other words, between the pressure source and the operating valve), and the second conduit. The setting valve, in an embodiment, is configured to allow a flow of the actuating fluid from the closing conduit to a recover unit, when a pressure in the closing conduit upstream the operating valve exceeds a threshold value.

In an embodiment, the pneumatic cylinder-piston actuator includes an opening chamber and a closing spring. In an embodiment, the pneumatic circuit includes a single opening conduit. The single opening conduit, in this embodiment, is connectable to a pressure source (e.g. a compressor). In an embodiment, the control unit is connected to the setting valve to set the first threshold value in the setting valve through an electrical signal. In an embodiment, the control unit is configured for selecting the first threshold value from a plurality of memorized values, as a function of a setting parameter. The setting parameter, in an embodiment, is set by the user. The setting parameter, in an embodiment, is representative of a typology of crop to be processed. For example, fresh crops could require a higher threshold value than dry crops. In another embodiment, the first threshold value is fixed.

It is expected also an embodiment, in which the operating valve and the setting valve are active valves, and in which the user checks on the manometer the pressure in the first conduit, upstream the operating valve. When said pressure exceeds the predetermined first threshold value, the user closes the operating valve, opens the setting valve and disconnect the pressure source from the first conduit.

In an embodiment, the hydraulic circuit includes a safety valve. Said at least a valve, in an embodiment, includes the safety valve. The safety valve, in an embodiment, is connected between the first conduit, downstream of the operating valve, and the second conduit. The safety valve is configured to allow a flow of the actuating fluid from the first conduit to the second conduit, when a first pressure in the first conduit downstream of the operating valve exceeds a second pressure in the second conduit of a predetermined second threshold value.

The second threshold value, in a preferred embodiment, is higher than the first threshold value.

In an embodiment, the first threshold value is selectable from a plurality of memorized values, through a selection (by the user) of a setting parameter, that is a number K from 1 to N. The selection may be carried out, for example, rotating a knob, or typing a number on a screen or on a keyboard. N in an embodiment is 2. N in an embodiment is 3. N in an embodiment is 4. N in an embodiment is 5. N in an embodiment is 6. N in an embodiment is 7. N in an embodiment is 8. N in an embodiment is 9. N in an embodiment is 10. In an embodiment, the first threshold value corresponding to the setting parameter K is equal to the first threshold value corresponding to the setting parameter (K−1) plus the difference between the second threshold value minus the first threshold value corresponding to the setting parameter K; said difference being divided by N and multiplied by K.

In an embodiment, the control unit is programmed for setting a reference pressure value based on a user selection. The user selection, in an embodiment, is representative of a desired density of the bale. The desired density of the bale depends, for example, on the type of the crops. The user selection, in an embodiment, is carried out rotating a knob to a certain number. The user selection, in an embodiment, is carried out typing a number on a screen or on a keyboard. The number, in an embodiment, is related to the reference pressure value. In an embodiment, the number is included between 2 and 10 (e.g. 2, 3, 4, 5, 6, 7, 8, 9, 10). The number, in another embodiment, is the reference pressure value. The control unit, in an embodiment, is programmed for comparing the control signal to the reference pressure value, to generate the alert signal depending on the reference pressure value being exceeded by the control signal.

In an embodiment, the baler comprises a user interface. The user interface, in an embodiment, can be positioned on the tractor. The user interface, in an embodiment, includes the user selection. The control unit is connected to the user interface. In an embodiment, the control unit is programmed for displaying, at the user interface, graphical data representative of the control signal and/or of the reference pressure value. Said displaying, at the user interface, of graphical data representative of the control signal and/or of the reference pressure value in a preferred embodiment, is in real time. Therefore, the user is informed in real time about the status of the pressure inside the closing chamber. The user is then informed in real time about the current density of the formed bale, compared to the desired density, represented by the reference pressure value. Thus, for example, it is up to the user to decide to stop the collecting of crops if the desired density is about to be reached, but he arrived to a border of the field.

The present description also covers a method for producing round bales in a baler connected to a tractor.

The method, in an embodiment, comprises a step of moving a tailgate to a closed position. In the closed position, in an embodiment, the tailgate cooperates with a frame to form a chamber delimited by a plurality of rollers. In another embodiment, the tailgate cooperates with a frame to form a chamber delimited by a plurality of belts.

The moving of the tailgate to a closed position, in an embodiment, is carried out by feeding an actuating fluid to a closing chamber of a cylinder-piston actuator.

The moving of the tailgate to a closed position, in an embodiment, is carried out by a traction of a spring. The moving of the tailgate to a closed position, in an embodiment, is carried out by a compression of a spring. The method, in an embodiment, comprises a step of forming a bale in the chamber. The forming of the bale, in an embodiment, is carried out by rotating crops received in the chamber. The step of forming the bale, in an embodiment, comes after the step of moving the tailgate to the closed position.

The method, in an embodiment, comprises a step of generating an alert signal. The alert signal, in an embodiment, is configured to warn the user to stop an advancing motion of the tractor. The step of generating an alert signal comes after the step of forming the bale has been completed. The method, in an embodiment, comprises a step of binding the formed bale with a fastening element. The step of binding the formed bale comes after the step of forming the bale has been completed.

The method, in an embodiment, comprises a step of moving the tailgate to an open position. The step of moving the tailgate to the open position, in an embodiment, comes after the step of binding the bale. The step of moving the tailgate to the open position is carried out to discharge the bound bale.

The method, in an embodiment, comprises a step of detecting a control signal. The control signal, in an embodiment, is representative of a pressure inside the closing chamber of the cylinder-piston actuator, when the tailgate is in the closed position. In an embodiment, the alert signal is generated as a function of the control signal. Thus, the alert signal warns the user stopping an advancing motion of the tractor, therefore stopping collecting crops, when the bale is completely formed. The instant when the bale is completely formed is determined by the control signal, representative of a pressure inside the closing chamber.

The method, in an embodiment, comprises a step of receiving a user selection representative of a desired density for the formed bale. The desired density of the bale depends, for example, on the type of the crops. The user selection is, in an embodiment, the selection of a number K from 1 to N. The selection may be carried out, for example, by rotating a knob, or by typing a number on a screen or on a keyboard. N in an embodiment is 2. N in an embodiment is 3. N in an embodiment is 4. N in an embodiment is 5. N in an embodiment is 6. N in an embodiment is 7. N in an embodiment is 8. N in an embodiment is 9. N in an embodiment is 10. The method, in an embodiment, comprises a step of deriving a reference pressure value based on the user selection.

In an embodiment, the alert signal is generated when the control signal exceeds the reference pressure value. In that moment, actually, the bale has a density so high to push the tailgate towards the open position that the cylinder-piston actuator reaches a reference pressure in its closing chamber to keep the tailgate closed, winning the pushing force exerted by the bale.

The method, in an embodiment, comprises a step of displaying, in real time at a user interface, graphical data. The graphical data, in an embodiment, are representative of the control signal. The graphical data, in an embodiment, are representative of the reference pressure value. The graphical data, in an embodiment, are representative of a comparison between the control signal and the reference pressure value.

In an embodiment, in the step of moving the tailgate to the closed position, the actuating fluid is fed to the closing chamber through an operating valve. The operating valve, in an embodiment, is configured for retaining the actuating fluid in the closing chamber. The pressure inside the closing chamber, in an embodiment, is detected by measuring a pressure of a first conduit which puts in fluid communication the operating valve and the closing chamber. The pressure inside the closing chamber, in an embodiment, is detected by measuring a pressure of a first conduit downstream of the operating valve. The pressure inside the closing chamber, in an embodiment, is detected by measuring a pressure of a first conduit between the operating valve and the closing chamber. The pressure inside the closing chamber, in an embodiment, is detected through a pressure sensor. The pressure sensor, in an embodiment, is a manometer.

In an embodiment, the step of moving the tailgate to the open position is accomplished by feeding the actuating fluid to an opening chamber of the cylinder-piston actuator. In this embodiment, the cylinder-piston actuator is a double effect actuator. In an embodiment, in the step of moving the tailgate to the open position, the operating valve is forced to an open position, for releasing the actuating fluid from the closing chamber. The forcing of the operating valve in an open position, in an embodiment, is carried out by a driver, connected to the operating valve, responsive to a pressure of the actuating fluid in the opening chamber. The driver, in an embodiment, lets the actuating fluid flowing in the opening chamber flow to the operating valve forcing it, by its pressure, to open. In this embodiment, the forcing of the operating valve in an open position, is carried out in response to a pressure of the actuating fluid in the opening chamber. The forcing of the operating valve in an open position, in another embodiment, is electronically commanded. The forcing of the operating valve in an open position, in another embodiment, is commanded by the user.

In an embodiment, the feeding of the actuating fluid to the closing chamber and/or to the opening chamber is carried out through a pressure source. The pressure source is alternatively connected to the first conduit and to a second conduit. The first conduit is in fluid communication with the closing chamber. The operating valve, in an embodiment, is positioned inside the first conduit, between the pressure source and closing chamber. The second conduit is in fluid communication with the opening chamber. In an embodiment, in the step of moving the tailgate to the closed position, the actuating fluid is fed to the closing chamber until a setting configuration is reached. The setting configuration is a function of a first threshold value. The setting configuration, in an embodiment, is given by the control signal exceeding the first threshold value.

The method, in an embodiment, comprises a step of receiving a setting parameter set by the user and representative of a typology of crop to be processed. The first threshold value is selected from a plurality of memorized values, in response to the setting parameter.

In an embodiment, when the setting configuration (which depends on the threshold value) is reached, the step of closing the tailgate ends.

The reaching of the setting configuration, in an embodiment, is detected by a setting valve. The setting valve, in an embodiment, is sensitive to the pressure of the actuating fluid in the closing chamber. The setting valve, in an embodiment, is a passive valve, actuated by a spring. The setting valve, in an embodiment, is an active valve, actuated by an electronic command.

In an embodiment, when the pressure inside the closing chamber exceeds a second threshold value (higher than the first threshold value), a safety valve is opened, allowing the actuating fluid flowing from the closing chamber to the opening chamber. Therefore, the safety valve preserves the closing chamber from damages due to a too high pressure.

The method, in an embodiment, comprises a step of displaying, in real time at a user interface, graphical data representative of the control signal and/or the reference pressure value.

BRIEF DESCRIPTION OF DRAWINGS

This and other features of the invention will become more apparent from the following detailed description of a preferred, non-limiting example embodiment of it, with reference to the accompanying drawings, in which.

DETAILED DESCRIPTION OF PREFERRED EMBODIMENTS OF THE INVENTION

With reference to the accompanying drawings, the numeral 1 denotes a baler, according to the present disclosure.

Figure 1:
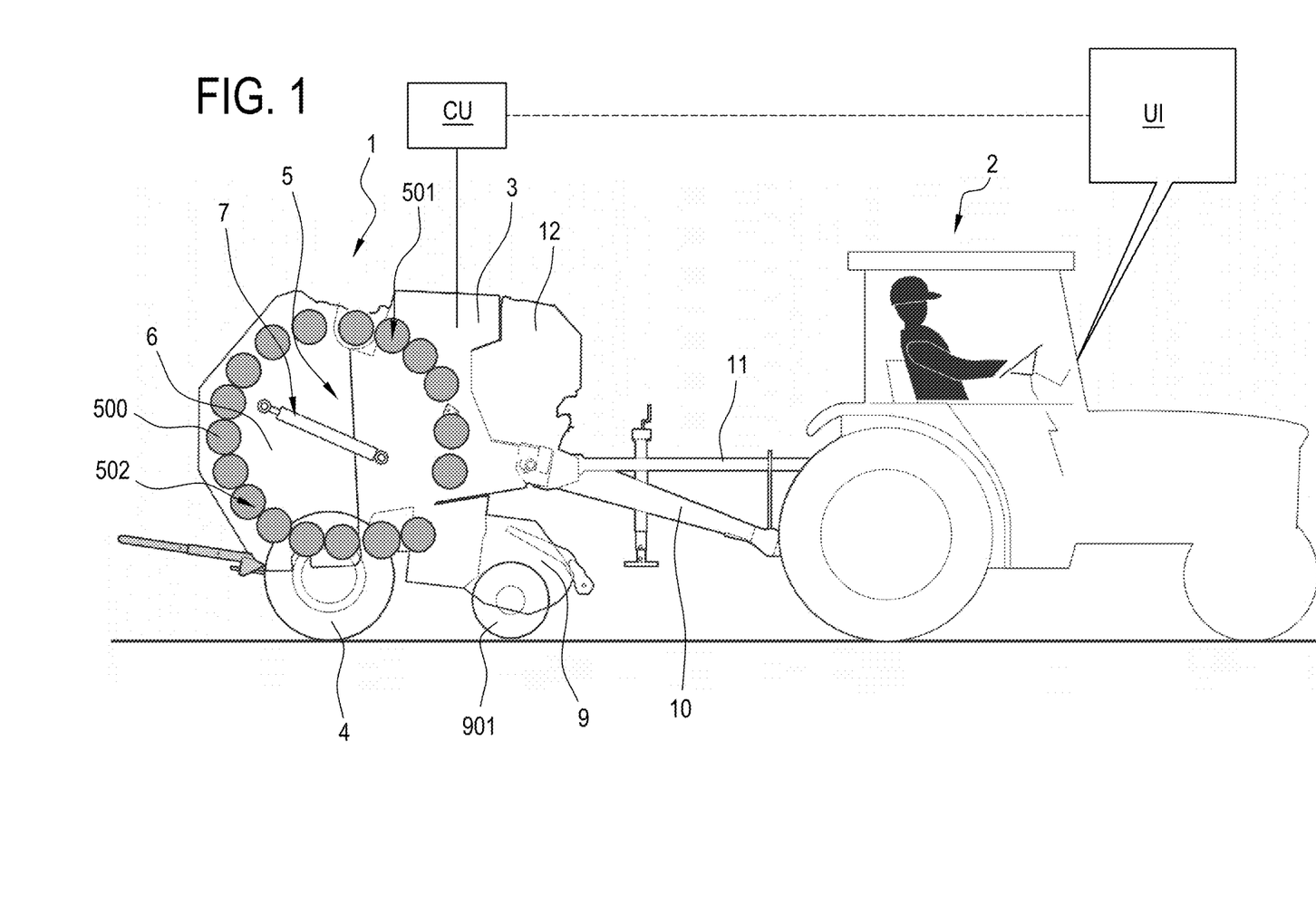
FIG. 1 illustrates a baler connectable to a tractor, according to the present description, and the tractor.

The baler 1 is connectable to a tractor 2. The baler 1, in an embodiment, includes a tongue 10. The tongue 10 is connectable to tractor 2. The tongue 10 is configured to allow the tractor 2 towing the baler 1. The baler 1, in an embodiment, includes a drive shaft 11. The drive shaft 11, in an embodiment, is a cardan shaft. The drive shaft 11 is configured to transmit mechanical rotation from a motor of the tractor 2 to the baler 1. The baler 1, in an embodiment, includes a frame 3. The frame 3, in an embodiment, is supported on a (wheel) axle. The axle wheel is movably connected, at its end, to a pair of wheels 4.

The baler 1, in an embodiment, includes a tailgate 6. The tailgate 6 is connected to the frame 3. The tailgate 6 is movable between a closed position and an open position. The open position is configured for discharging the bale.

The baler 1, in an embodiment, includes a chamber 5. The chamber 5 is configured for receiving crops and for housing a formed (forming) bale.

The baler 1 also comprises a conveying assembly, which has the function to move (rotate) the crops contained in the chamber, in order to progressively form the round bale.

The conveying assembly delimits at least a portion of the chamber 5; in particular, the conveying assembly delimits radially the chamber 5 around its (circular or substantially circular) periphery.

In an embodiment, the conveying assembly has a first portion provided in the frame 3 and a second portion provided in the tailgate; in other words, the conveying assembly is arranged partly in the frame and partly in the tailgate 6.

In an embodiment (which is not limitative, as many other embodiments are possible), the conveying assembly includes a plurality of rollers 500. The plurality of rollers 500 delimits the chamber 5. The plurality of rollers 500, in an embodiment, includes a first group 501 of rollers 500. The plurality of rollers 500, in an embodiment, includes a second group 502 of rollers 500. The first group 501 of rollers 500 is provided in the frame 3. The second group 502 of rollers 500 is provided in the tailgate 6. The tailgate 6 in the closed position (illustrated) cooperates with the frame 3 to delimit the chamber 5.

Figure 2:
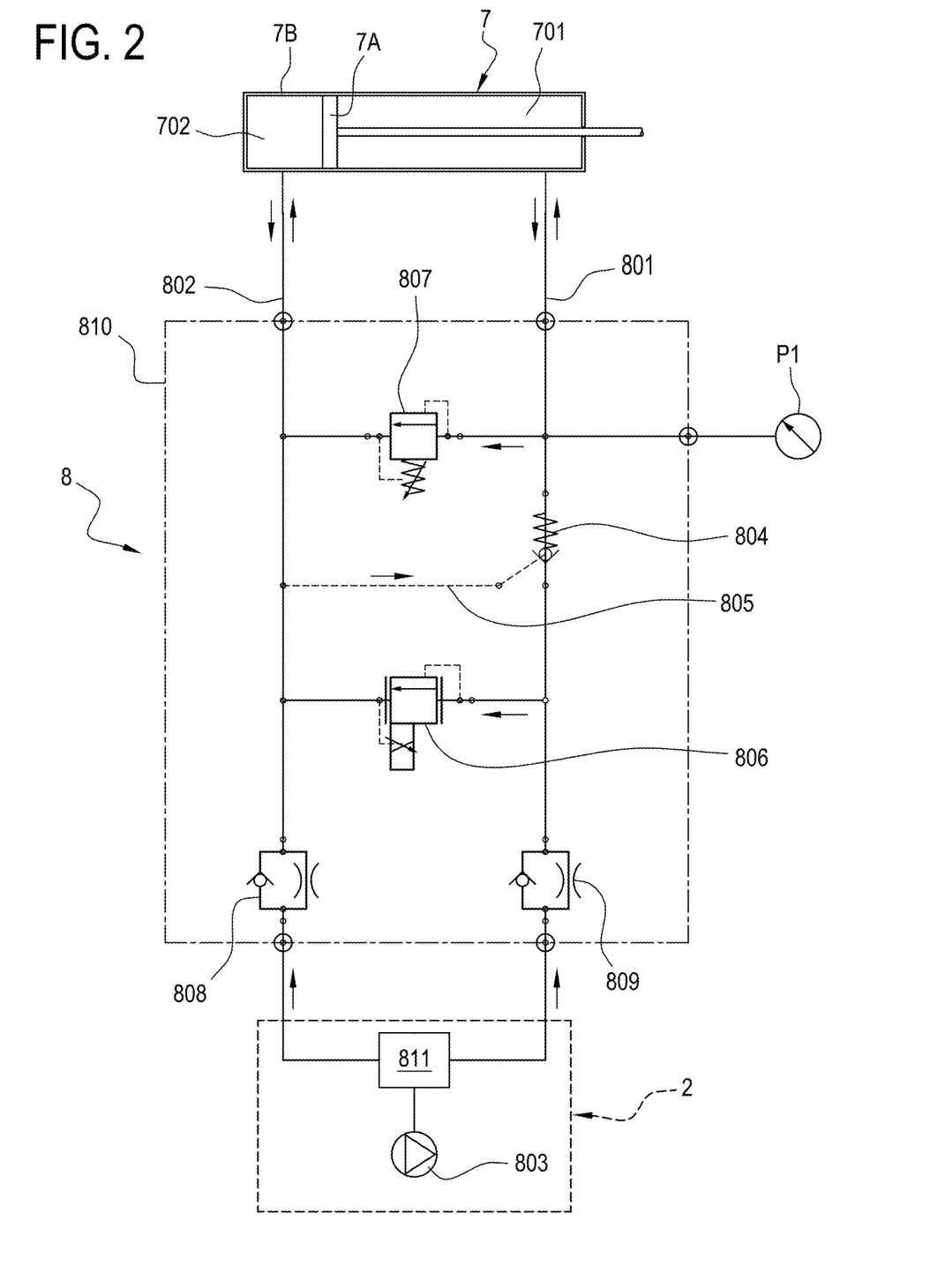
FIG. 2 illustrates a hydraulic circuit of the baler of FIG. 1.

The baler 1, in an embodiment, includes a cylinder-piston actuator 7. The cylinder-piston actuator 7 includes a piston 7A. The cylinder-piston actuator 7 includes a piston 7A and a cylinder 7B. The piston 7A is configured to slide inside the cylinder 7B.

The cylinder piston actuator, in an embodiment, is a double effect actuator. The cylinder-piston actuator 7, in an embodiment, includes a closing chamber 701. The cylinder-piston actuator 7, in an embodiment, includes an opening chamber 702.

The cylinder piston actuator 7, in an embodiment, is connected to the frame 3. The cylinder piston actuator 7 is connected to the tailgate 6. In an embodiment, the piston 7A is connected to the tailgate 6 and the cylinder is connected to the frame 3. In another embodiment (not illustrated), the piston 7A is connected to the frame 3 and the cylinder 7B is connected to the tailgate 6.

The cylinder piston actuator 7, in an embodiment, is configured to move the tailgate 6 from the open position to the closed position, upon receiving an actuating fluid in the closing chamber 701.

The cylinder piston actuator 7, in an embodiment, is configured to move the tailgate 6 from the closed position to the open position, upon receiving an actuating fluid in the opening chamber 702.

The cylinder piston actuator 7, in an embodiment, is a hydraulic actuator. The baler 1, in an embodiment, comprises a hydraulic circuit 8. The hydraulic circuit 8, in an embodiment, includes a first conduit 801. The hydraulic 8, in an embodiment, includes a second conduit 802. The first conduit 801 is in fluid communication with the closing chamber 701. The second conduit 802 is in fluid communication with the opening chamber 702.

The first conduit 801 and the second conduit 802 are selectively connectable to a pump 803. The first conduit 801 and the second conduit 802, in an embodiment, are connectable to the pump through a distributor 811. The distributor 811 is movable between three positions. A first position, to connect the pump 803 to the first conduit 801. A second position, to connect the pump 803 to the second conduit 802. A third position, to isolate the pump 803 from the hydraulic circuit 8. The pump is connected to an actuating fluid reservoir, not illustrated. The actuating fluid reservoir, in an embodiment, is provided inside the tractor 2. The actuating fluid reservoir, in an embodiment, is provided inside the baler 1. The pump 803 is provided inside the tractor 2. The distributor 811 is provided inside the tractor 2.

The first conduit 801, in an embodiment, includes a first choker 808. The second conduit 802, in an embodiment, includes a second choker 809. The first choker 808 and the second choker 809 provide a regulating of the flow of the actuating fluid, respectively in the first conduit 801 and in the second conduit 802.

The baler 1, in an embodiment, includes a binder 12. The binder 12, in an embodiment, is provided in the frame 3. The binder 12 is configured for binding the bale with a fastening element.

The baler 1, in an embodiment, includes a pick-up assembly 9. The pick-up assembly 9 is configured to collect the crops. The pick-up assembly, in an embodiment, includes a pick-up shaft having rake teeth. The pick-up shaft is configurated to rotate. The pick-up assembly 9, in an embodiment, comprises a pair of pick-up wheels 901, movably connected to the ends of the pick-up shaft.

The baler 1, in an embodiment, includes a pushing rotor. The pushing rotor is positioned between the pick-up assembly 9 and the chamber 5, to feed the crops collected by the pick-up assembly 9 to the chamber 5. In another embodiment, the pick-up assembly itself is configured to feed the collected crops to the chamber 5.

The baler 1, in an embodiment, includes a pressure sensor P1. The pressure sensor P1, in an embodiment, is connected to the first conduit 801. The pressure sensor P1 is configured for detecting a control signal. The control signal is representative of a pressure inside the closing chamber 701.

The baler 1, in an embodiment, includes a control unit. The control unit is configured to generate an alert signal as a function of the control signal. The hydraulic circuit 8, in an embodiment, includes a hydraulic circuit casing 810. The hydraulic circuit casing 810, in an embodiment, is made of aluminum.

The hydraulic circuit 8, in an embodiment, includes an operating valve 804. The operating valve 804, in an embodiment, is inserted in the first conduit 801. The operating valve 804, in an embodiment, is inserted in the first conduit 801 between the pump 803 and the closing chamber 701. The operating valve 804, in an embodiment, is a non-return valve. The operating valve 804, in an embodiment, is operable in an open position, for allowing the actuating fluid to flow from the pump 803 to the closing chamber 701, and in a closed position, for retaining the actuating fluid in the closing chamber 701. Actually, the operating valve 701 allows a flow of the actuating fluid from the pump 803 to the closing chamber 701, but not an opposite flow of the actuating fluid from the closing chamber 701 to the pump 803.

The pressure sensor P1 is connected to the first conduit 801 downstream of the operating valve 804 (in other words, between the operating valve 804 and the closing chamber 701).

The hydraulic circuit 8, in an embodiment, includes a driver 805. The driver 805, in an embodiment, is a conduit, which is in fluid communication with the operating valve 804 and with the second conduit 802. The driver 805 is connected to the operating valve 804 to force it in the open position, responsive to a pressure in the second conduit 802. The driver 805 allows the closing chamber 701 to empty when the opening chamber 702 is filling.

The hydraulic circuit 8, in an embodiment, includes a setting valve 806. The setting valve 806 is connected to a conduit that connects the first conduit 801, upstream the operating valve 804, to the second conduit 802. The setting valve 806, in an embodiment, is a solenoid valve. The setting valve 806 is configured to allow a flow of the actuating fluid from the first conduit 801 to the second conduit 802, when a pressure in the first conduit 801 exceeds a second pressure in the second conduit 802 of a predetermined first threshold value. The first threshold value, in an embodiment, is 100 bars.

The hydraulic circuit 8, in an embodiment, includes a safety valve 807. The safety valve 807 is connected to a conduit that connects the first conduit 801, downstream of the operating valve 804, to the second conduit. The safety valve 807, in an embodiment, is a single-effect valve. The safety valve 807 is configured to allow a flow of the actuating fluid from the first conduit 801 to the second conduit 802, when a first pressure in the first conduit 801 exceeds a second pressure in the second conduit 802 of a predetermined second threshold value. The second threshold value, in an embodiment, is 230 bars.

The present description covers also a method for producing round bales in a baler 1 connected to a tractor 2.

The method, in an embodiment, includes a step of moving a tailgate 6 to a closed position. In the closed position, the tailgate 6 cooperates with a frame 3 to form a chamber 5 delimited by a plurality of rollers 500. The step of moving the tailgate 6 in the closed position, in an embodiment, includes a connection of a pump 803 to a first conduit 801 and a pressurizing of an actuating fluid in the first conduit 801. The first conduit 801 is connected to a closing chamber 701 of a cylinder-piston actuator 7. In this step, an operating valve 804, positioned in the first conduit between the pump 803 and the closing chamber 701, lets the actuating fluid flowing into the closing chamber 701. The actuating fluid, by feeding to the closing chamber 701, provides an expansion of the closing chamber 701, resulting in a movement of the piston 7A in a direction that moves the tailgate 6 in the closed position.

The method, in an embodiment, comprises a step of receiving a setting parameter set by the user and representative of a typology of crop to be processed. The first threshold value is selected from a plurality of memorized values, in response to the setting parameter.

The step of moving the tailgate 6 to the closed position last until a setting configuration is reached. The setting configuration is detected by a setting valve 806. In the setting valve 806, the first threshold value is set (through an electric signal which depends on the setting parameter). When a first pressure of the actuating fluid in the first conduit 801 exceeds a second pressure of the actuating fluid in the second conduit 802 of the predetermined threshold value, the setting valve 806 allows a flow of the actuating fluid from the first conduit 801 to the second conduit 802. In that way, the step of moving a tailgate 6 to a closed position ends.

The method, in an embodiment, comprises a step of collecting crops. The method, in an embodiment, comprises a step of forming a bale in the chamber 5, by rotating crops received in the chamber 5. The crops are collected and received in the chamber 5 through a pick-up assembly 9. The method, in an embodiment, comprises a step of detecting a control signal, representative of a pressure inside the closing chamber 701 of the cylinder-piston actuator 7 (when the tailgate 6 is in the closed position). The pressure inside the closing chamber 701 is detected by measuring the pressure of the actuating fluid in the first conduit 801, downstream of the operating valve 804 and the closing chamber 701.

The method, in an embodiment, comprises a step of receiving a user selection representative of a desired density for the formed bale. The method, in an embodiment, comprises a step of deriving a reference pressure value based on the user selection.

During the step of forming the bale, the bale grows. When the bale has reached a desired density, the pressure inside the closing chamber 701 (represented by the control signal) reaches the reference pressure. In that moment, when the control signal exceeds the reference pressure value, an alert is generated. The alert warns the user to stop an advancing motion of the tractor 2.

After the alert has been given, the user stops the advancing motion of the tractor 2. By stopping the advancing motion, he stops collecting crops: the bale has been formed. Therefore, the method provides a step of binding the formed bale with a fastening element. During the step of binding the formed bale, the operating valve 804 retains the operating fluid in the closing chamber 701, thus keeping the tailgate 6 closed.

Afterwards, the method comprises a step of moving the tailgate 6 in an open position, to discharge the formed bale. The step of moving the tailgate 6 in the open position, in an embodiment, includes a connection of the pump 803 to a second conduit 802 and a pressurizing of the actuating fluid in the second conduit 802. The second conduit 802 is connected to a opening chamber 702 of a cylinder-piston actuator 7. The actuating fluid, by feeding to the opening chamber 702, provides an expansion of the opening chamber 702, resulting in a movement of the piston 7A in a direction that moves the tailgate 6 in the open position. During the step of moving the tailgate 6 to the open position, the operating valve 804 is opened by a driver, to allow the closing chamber 701 to empty. During the step of moving the tailgate 6 to the open position, the actuating fluid flows from the closing chamber 701 to the distributor 811, through the operating valve 804, which is opened. The driver, in an embodiment, is a conduit that connects the second conduit 802 to the operating valve 804. In an embodiment, the pressure of the actuating fluid inside the second conduit 802 wins the elastic force of a spring included in the operating valve 804, resulting in an opening of the operating valve 804.

The invention claimed is:

1. A baler connectable to a tractor for providing round bales, comprising:
 a frame supported on a wheel axle;
 a chamber for receiving crops and for housing a formed bale, the chamber having a fixed, predetermined size;

a tailgate connected to the frame and movable between a closed position, for cooperating with the frame to delimit the chamber, and an open position, for discharging the formed bale;

a conveying assembly, which delimits the chamber for imparting a rotating movement to the crops contained in the chamber, and has a first portion provided in the frame and a second portion provided in the tailgate;

a cylinder-piston actuator, which includes a closing chamber and is connected to the frame and to the tailgate to move the tailgate from the open position to the closed position, upon receiving an actuating fluid in the closing chamber;

a binder, configured for binding the formed bale with a fastening element;

a pressure sensor for detecting a control signal representative of a pressure inside the closing chamber of the cylinder-piston actuator;

a control unit, programmed for comparing the control signal to a reference pressure value, and for generating an alert signal depending on the reference pressure value being exceeded by the control signal, wherein the control unit is configured to receive a user selection and is programmed for setting the reference pressure value based on the user selection, wherein the cylinder-piston actuator is a double effect actuator, which includes, further to the closing chamber, an opening chamber, which can be fed with the actuating fluid for commanding a movement of the tailgate from the closed position to the open position, wherein the cylinder-piston actuator is a hydraulic actuator and wherein the baler comprises a hydraulic circuit including:

a first conduit and a second conduit, which are selectively connectable to a pressure source and are in fluid communication with the closing chamber and with the opening chamber of the cylinder-piston actuator, respectively; and wherein the hydraulic circuit includes at least a valve which is connected between the first conduit and the second conduit and is configured to allow a flow of the actuating fluid from the first conduit to the second conduit, when a first pressure in the first conduit exceeds a second pressure in the second conduit of a predetermined threshold value.

2. The baler of claim 1, comprising a user interface, which can be positioned on the tractor, wherein the control unit is programmed for displaying, at the user interface, graphical data representative of the control signal and/or of the reference pressure value.

3. The baler of claim 2, wherein the control unit is programmed for displaying the graphical data at the user interface in real time.

4. The baler of claim 3, wherein the hydraulic circuit includes:

an operating valve, which is inserted in the first conduit and is operable in an open position, for allowing the actuating fluid to flow from the pressure source to the closing chamber, and in a closed position, for retaining the actuating fluid in the closing chamber;

a driver, connected to the operating valve to force it in the open position, responsive to a pressure in the second conduit, and wherein the pressure sensor is in fluid communication with the first conduit, downstream of the operating valve.

5. The baler of claim 4, wherein the hydraulic circuit includes a setting valve, which is connected between the first conduit, upstream the operating valve, and the second conduit, and is configured to allow a flow of the actuating fluid from the first conduit to the second conduit, when a first pressure in the first conduit upstream the operating valve exceeds a second pressure in the second conduit of a predetermined first threshold value.

6. The baler of claim 5, wherein the control unit is connected to the setting valve to set the first threshold value in the setting valve through an electrical signal, and is configured for selecting the first threshold value from a plurality of memorized values, as a function of a setting parameter set by the user and representative of a typology of crop to be processed.

7. The baler of claim 4, wherein the hydraulic circuit includes a safety valve, which is connected between the first conduit, downstream of the operating valve, and the second conduit, and is configured to allow a flow of the actuating fluid from the first conduit to the second conduit, when a first pressure in the first conduit downstream of the operating valve exceeds a second pressure in the second conduit of a predetermined second threshold value.

8. The baler of claim 1, wherein the control unit is programmed to set the predetermined threshold value responsive to the user selection.

9. A method for producing round bales in a baler connected to a tractor, comprising the following steps:

moving, by feeding an actuating fluid to a closing chamber of a cylinder-piston actuator, a tailgate to a closed position, where the tailgate cooperates with a frame to form a chamber;

forming a bale in the chamber, by rotating crops received in the chamber, wherein the chamber size remains fixed during the formation of the bale;

binding the formed bale with a fastening element;

moving the tailgate to an open position, to discharge the bound bale, detecting a control signal, representative of a pressure inside the closing chamber of the cylinder-piston actuator, when the tailgate is in the closed position;

generating an alert signal as a function of the control signal, to provide a user with information about an operation or status of the baler;

receiving a user selection representative of a desired density for the formed bale;

deriving a reference pressure value based on the user selection;

wherein the alert signal is generated when the control signal exceeds the reference pressure value, wherein, in the step of moving the tailgate to the closed position, the actuating fluid is fed to the closing chamber until a setting configuration is reached, as a function of a first threshold value, and comprising a step of receiving a setting parameter set by the user and representative of a typology of crop to be processed, wherein the first threshold value is selected from a plurality of memorized values, in response to the setting parameter.

10. The method of claim 9, comprising a step of displaying, in real time at a user interface, graphical data representative of the control signal.

11. The method of claim 9, comprising a step of displaying, at a user interface, graphical data representative the reference pressure value.

12. The method of claim 9, wherein, in the step of moving the tailgate to the closed position, the actuating fluid is fed to the closing chamber through an operating valve, which is configured for retaining the actuating fluid in the closing chamber, and wherein the pressure inside the closing chamber is detected by measuring a pressure of a first conduit which puts in fluid communication the operating valve and the closing chamber.

13. The method of claim 12, wherein the step of moving the tailgate to the open position is accomplished by feeding the actuating fluid to an opening chamber of the cylinder-piston actuator, which is a double effect actuator, and wherein the operating valve is forced to an open position, for releasing the actuating fluid from the closing chamber, in response to a pressure of the actuating fluid in the opening chamber.

14. A baler connectable to a tractor for providing round bales, comprising:
   a frame supported on a wheel axle;
   a chamber for receiving crops and for housing a formed bale, the chamber having a fixed, predetermined size;
   a tailgate connected to the frame and movable between a closed position, for cooperating with the frame to delimit the chamber, and an open position, for discharging the formed bale;
   a conveying assembly, which delimits the chamber for imparting a rotating movement to the crops contained in the chamber, and has a first portion provided in the frame and a second portion provided in the tailgate;
   a cylinder-piston actuator, which includes a closing chamber and is connected to the frame and to the tailgate to move the tailgate from the open position to the closed position, upon receiving an actuating fluid in the closing chamber, wherein the cylinder-piston actuator is a hydraulic actuator;
   a hydraulic circuit including a first conduit and a second conduit, which are selectively connectable to a pressure source and are in fluid communication with the closing chamber and with the opening chamber of the cylinder-piston actuator, respectively,
   wherein the hydraulic circuit further includes at least a valve which is connected between the first conduit and the second conduit, and is configured to allow a flow of the actuating fluid from the first conduit to the second conduit, when a first pressure in the first conduit exceeds a second pressure in the second conduit of a predetermined threshold value;
   a pressure sensor for detecting a control signal representative of a pressure inside the closing chamber of the cylinder-piston actuator; and
   a control unit, programmed for comparing the control signal to a reference pressure value, and for generating an alert signal depending on the reference pressure value being exceeded by the control signal,
   wherein the control unit is configured to receive a user selection and is programmed for setting the reference pressure value based on the user selection.

15. The baler of claim 14, wherein said at least a valve includes a setting valve, which is connected between the first conduit, upstream an operating valve, and the second conduit.

16. The baler of claim 14, wherein said at least a valve includes a safety valve, which is connected between the first conduit, downstream of an operating valve, and the second conduit.

17. A baler connectable to a tractor for providing round bales, comprising:
   a frame supported on a wheel axle;
   a chamber for receiving crops and for housing a formed bale, the chamber having a fixed, predetermined size;
   a tailgate connected to the frame and movable between a closed position, for cooperating with the frame to delimit the chamber, and an open position, for discharging the formed bale;
   a conveying assembly, which delimits the chamber for imparting a rotating movement to the crops contained in the chamber, and has a first portion provided in the frame and a second portion provided in the tailgate;
   a cylinder-piston actuator, which includes a closing chamber and is connected to the frame and to the tailgate to move the tailgate from the open position to the closed position, upon receiving an actuating fluid in the closing chamber;
   a binder, configured for binding the formed bale with a fastening element;
   a pressure sensor for detecting a control signal representative of a pressure inside the closing chamber of the cylinder-piston actuator; and
   a control unit, programmed for comparing the control signal to a reference pressure value, and for generating an alert signal depending on the reference pressure value being exceeded by the control signal,
   wherein the control unit is configured to receive a user selection and is programmed for setting the reference pressure value based on the user selection,
   wherein the control unit is programmed to move the tailgate to the closed position, in response to receiving the actuating fluid in the closing chamber and in response to reaching a setting configuration, as a function of a first threshold value, and
   wherein the control unit is programmed to receive a setting parameter set by the user and representative of a typology of crop to be processed, wherein the first threshold value is selected from a plurality of memorized values, in response to the setting parameter.

* * * * *